US010630493B2

(12) United States Patent
Shor et al.

(10) Patent No.: US 10,630,493 B2
(45) Date of Patent: Apr. 21, 2020

(54) PHYSICAL UNCLONABLE FUNCTIONS RELATED TO INVERTER TRIP POINTS

(71) Applicant: Bar Ilan University, Ramat Gan (IL)

(72) Inventors: Joseph Shor, Tel Mond (IL); Roi Levi, Bruchin (IL); Yoav Weizman, Kfar Vitkin (IL)

(73) Assignee: Birad—Research & Development Company Ltd., Ramat Gan (IL)

( * ) Notice: Subject to any disclaimer, the term of this patent is extended or adjusted under 35 U.S.C. 154(b) by 226 days.

(21) Appl. No.: 15/825,457

(22) Filed: Nov. 29, 2017

(65) Prior Publication Data

US 2019/0165953 A1 May 30, 2019

(51) Int. Cl.
*H04L 9/32* (2006.01)
*H04W 12/06* (2009.01)
*G09C 1/00* (2006.01)
*H04L 9/08* (2006.01)

(52) U.S. Cl.
CPC ............. *H04L 9/3278* (2013.01); *G09C 1/00* (2013.01); *H04L 9/0866* (2013.01); *H04W 12/06* (2013.01); *H04L 2209/122* (2013.01); *H04L 2209/127* (2013.01)

(58) Field of Classification Search
CPC .................................................. H04L 9/3278
USPC .......................................................... 380/257
See application file for complete search history.

(56) References Cited

U.S. PATENT DOCUMENTS

| 4,685,086 A | * | 8/1987 | Tran | G11C 11/412 365/190 |
| 6,492,830 B1 | * | 12/2002 | Ju | G01R 31/2621 324/762.09 |
| 6,625,741 B1 | * | 9/2003 | Post | G07B 17/00733 340/693.2 |
| 8,041,975 B2 | * | 10/2011 | Sahu | H03K 3/0375 327/143 |
| 2011/0255612 A1 | * | 10/2011 | Bernstein | H03M 13/1111 375/259 |

\* cited by examiner

*Primary Examiner* — Dant B Shaifer Harriman
(74) *Attorney, Agent, or Firm* — Dekel Patent Ltd.; David Klein (57) ABSTRACT

A physical unclonable function (PUF) array includes a plurality of PUF transistor cells each of which includes at least one inverter. An input and an output of the at least one inverter are shorted to a first reference node. There is adjustment circuitry for adjusting a reference voltage of the first reference node, and measurement circuitry for measuring a trip point of the at least one inverter. If the trip point is close to the reference voltage then bits of the at least one inverter are defined as unstable.

11 Claims, 6 Drawing Sheets

Trusted Environment

PUF Calibration

PHYSICAL UNCLONABLE FUNCTIONS RELATED TO INVERTER TRIP POINTS

FIELD OF THE INVENTION

The present invention relates generally to methods for detecting unreliable bits in transistor circuitry, particularly using physical unclonable functions related to trip points of inverters.

BACKGROUND OF THE INVENTION

Secured interaction between embedded devices is becoming ubiquitous in every platform in which it is implemented. Trusted environment involves authentication or identification by another party and/or secure transition of private information after the data was encrypted by a safe algorithm. The vast majority of secured interaction requires storing secured key inside or at the vicinity of the secured hardware. For example, in the case of mobile devices in the medium to low level security hazards, the secret key will be stored by external nonvolatile memory. Beside the cost and power drawbacks of this approach it is extremely vulnerable to security attacks.

Physical unclonable functions (PUFs) are used for authentication, identification and secret key storage with superior performance, lower cost and above all high resistance to reverse engineering or any kind of tampering by a hostile attacker. The PUFs rely on intrinsic undetectable manufacturing variations in the CMOS process. An example of an SRAM PUF scheme is described in the inventor's U.S. patent application Ser. No. 15/694,809, which is incorporated herein by reference.

The known intrinsic silicon PUF constructions can be classified into several basic classes based on the electrical attributes that determine the fingerprint binary output. The first major class relies on the random variations of cumulative delay on a digital circuit. This class includes the arbiter PUF, the ring oscillator PUF and glitch PUF. The second class of silicon PUF constructions uses random mismatch, in bistable memory loop elements. When device is powered up the loop is in a metastable state where any mismatch between the CMOS transistor comprising the loop will yield a probable resolution toward "1" or "0". This group includes the SRAM PUF, Mecca PUF and any other NOR/NAND latch or flip-flop based PUF.

These two classes of "digital" PUFs have very large PVT (process voltage temperature) and noise variations, leading to a constrained temperature specification for PUF operation (20-50° C.) and various error-correction-codes (ECC) and/or encumbering compensation hardware.

Figure 1:
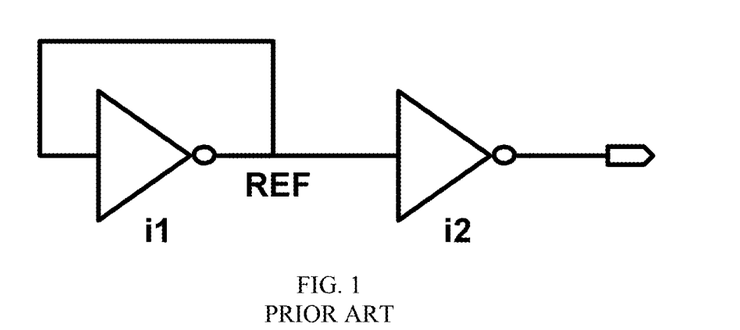
FIG. 1 is a circuit diagram of a prior art PUF that utilizes the trip point of an inverter.

A prior art PUF that utilizes the trip point of an inverter is shown in FIG. 1. In this PUF, a first inverter i1 is biased with its output connected to its input, such that the voltage will be Vm or Vref, the trip point of the inverter. The output of inverter i1 is input into a second inverter i2. The mismatches between the two trip points determine if the output will be a logical "1" or "0". If there is a sufficient mismatch, the PUF will always yield the same logical value, meaning the output will always be an unambiguous logical "1" or "0". However, if the mismatch is small, then the noise in the devices (thermal noise) or environmental noise will dominate, and the PUF can alternate between logical values, and hence be unstable.

SUMMARY OF THE INVENTION

The present invention seeks to provide a method and circuitry for reliable, repeatable and secure use of physical unclonable functions related to trip points of inverters, as is described more in detail hereinbelow.

In one embodiment, the method identifies any unstable PUF cells, so that they may be excluded from the array in the trusted environment. This reduces or eliminates the need for ECC. Since ECC expose some of the secret information as helper codes, it thus compromises the security. Therefore the invention, which reduces or eliminates ECC from the PUF array, significantly improves the security of this feature.

There is provided in accordance with an embodiment of the invention a physical unclonable function (PUF) array including a plurality of PUF transistor cells each of which includes at least one inverter, wherein an input of the at least one inverter are shorted to a first reference node, adjustment circuitry for adjusting a reference voltage of the first reference node, and measurement circuitry for measuring a trip point of the at least one inverter, wherein if the trip point is close to the reference voltage then bits of the at least one inverter are defined as unstable.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

It is noted that throughout the specification and claims, the term "connected" means a direct electrical connection between the things that are connected, without any intermediary devices. The term "coupled" means either a direct electrical connection between the things that are connected or an indirect connection through one or more passive or active intermediary devices. The term "circuit" or "circuitry" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on." For purposes of the embodiments, the transistors are metal oxide semiconductor (MOS) transistors, which include drain, source, gate, and bulk terminals, but the transistors may include any device implementing transistor functionality, such as without limitation, bi-polar junction transistors—BJT PNP/NPN, BiCMOS, CMOS, eFET, etc. Note that the inverter elements shown in the schematics have an input and an output which are shown explicitly in the schematic, but there is also implied a positive supply terminal (Vcc) and a negative supply terminal (Vss) of the inverters. When the negative and positive supply terminals are not connected to anything, it is implied that the negative supply terminal is connected to Vss, the negative supply, while the positive supply terminal is connected to Vcc, the positive supply, as is known in the art. Some of the schematics show connections of the implied negative and positive supply terminals to different supplies.

Figure 2:
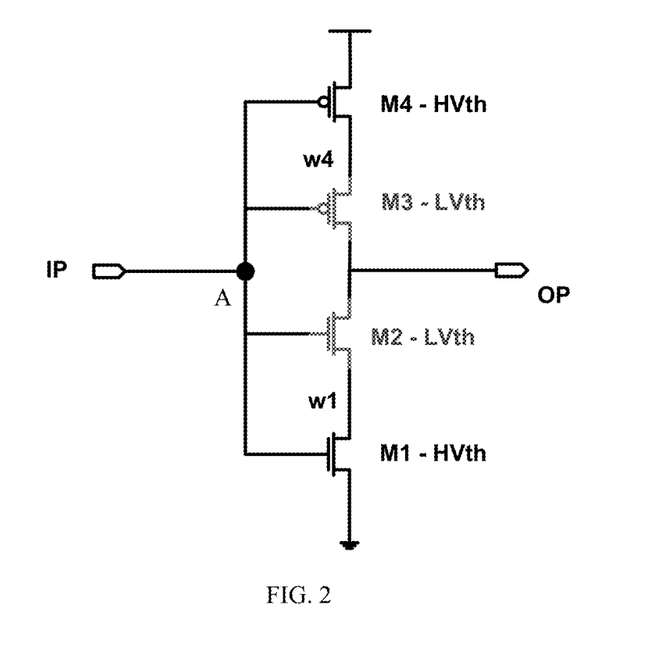
FIG. 2 is a circuit diagram of a high-gain inverter circuitry for use as a PUF, in accordance with a non-limiting embodiment of the invention.

Reference is now made to FIG. 2, which illustrates a high-gain inverter circuitry for use as a PUF, in accordance with a non-limiting embodiment of the invention.

The illustrated circuitry is as follows. An input signal IP is input, such as via a node A, to the gate of a PMOS transistor M4, to the gate of a PMOS transistor M3, to the gate of an NMOS transistor M2, and to the gate of an NMOS transistor M1. The transistors M1 and M4 are high threshold voltage MOS (HVt or HVth), while M2 and M3 are low threshold voltage MOS (LVt or LVth). This means the threshold voltages of transistors M1 and M4 are at least 1% higher than the threshold voltages of transistors M2 and M3. As an alternative, this means the threshold voltages of transistors M1 and M4 are at least 5% higher than the threshold voltages of transistors M2 and M3. As another alternative, this means the threshold voltages of transistors M1 and M4 are at least 10% higher than the threshold voltages of transistors M2 and M3. As another alternative, this means the threshold voltages of transistors M1 and M4 are at least 20% higher than the threshold voltages of transistors M2 and M3. As another alternative, this means the threshold voltages of transistors M1 and M4 are at least 30% higher than the threshold voltages of transistors M2 and M3.

The source of M4 is coupled to a voltage source Vcc. The drain of M4 is coupled to the source of M3. The source of M1 is coupled to ground and the drain of M1 is coupled to the source of M2. The drains of M2 and M3 are coupled to each other and to the output signal OP of the circuit.

Accordingly, transistors M1 and M4 are high threshold voltage MOS transistors as opposed to M2 and M3, which are low threshold voltage MOS transistors. By placing lower threshold voltages near the drain, all of the transistors are in saturation, and there is a cascoding effect, which increases the gain of the inverter. This enables the PUF to be less sensitive to noise effects because of the larger gain which improves the signal-to-noise ratio (SNR).

Optionally, a regular, that is, "non-high-gain", inverter may be added to the high-gain inverter of FIG. 2, in which the regular inverter has only one PMOS and one NMOS (such as just M1 and M4 or just M2 and M3). This creates a combination high-gain and low-gain inverter circuitry for use as a PUF. The present invention can utilize either high gain inverters, regular inverters or a combination of both types.

Figure 3:
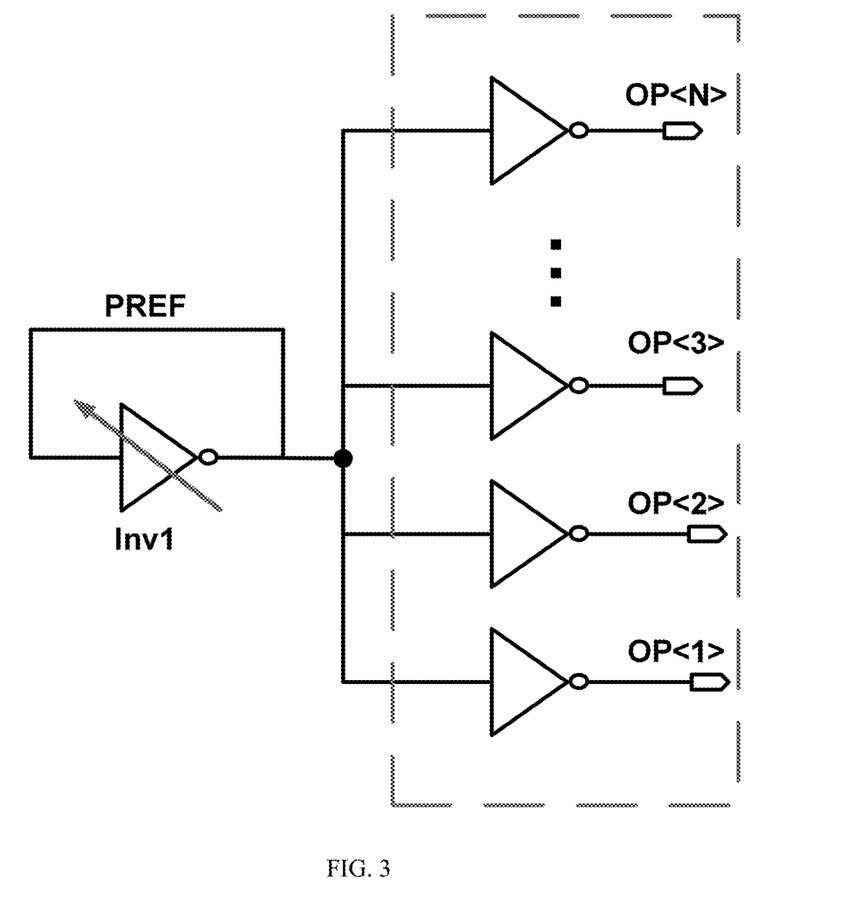
FIG. 3 is a circuit diagram of a further enhancement of the PUF array, in accordance with a non-limiting embodiment of the invention.

Reference is now made to FIG. 3, which illustrates a further enhancement of the PUF array. An upsized inverter, called a reference inverter, Inv1, whose input and output are shorted together, is used to bias the gates of an entire inverter array to the trip point PREF of Inv1. Inv1 is an example of adjustment circuitry to adjust the trip point of the inverters in the array. Each inverter in the array can optionally be constructed with the high gain inverter circuitry shown in FIG. 2 or can be a standard inverter containing only a single PMOS and NMOS. Each inverter in the array reacts based on the trip point PREF. Those inverters which have a higher trip point will produce a logic 0, while those with a lower trip point will output a logic 1. Any inverter in the array whose trip point is close to PREF may be unstable. By scanning PREF (such as at a high resolution available to analog circuits), the marginal bits may be detected (quickly—at the scanning speed) as those bits that are not unambiguously logic 1 or 0. Analog techniques, such as cascoding and tapering, may be used to enhance the gain and SNR of the individual PUF inverter cells, which make them behave more like analog amplifiers than simple CMOS inverters, as shown in FIG. 2. By shorting all of the PUF cell gates to the same node, the thermal noise is reduced compared to the PUF of FIG. 1, since the noise is proportional to KT/C, wherein K is Botzmann's constant, T=temperature and C=capacitance. It should be noted that the outputs of the PUF array, shown in FIG. 3 as a bus OP<1:N>, can be input into inverter buffers in order to further amplify the signal to digital levels. Some of these outputs may not yet be at their full logical level, but rather at some intermediate level above or below the trip point. Inputting them into subsequent inverters will insure that they reach the full logic 1 and 0 levels, as is known by people well versed in the art.

Figure 4:
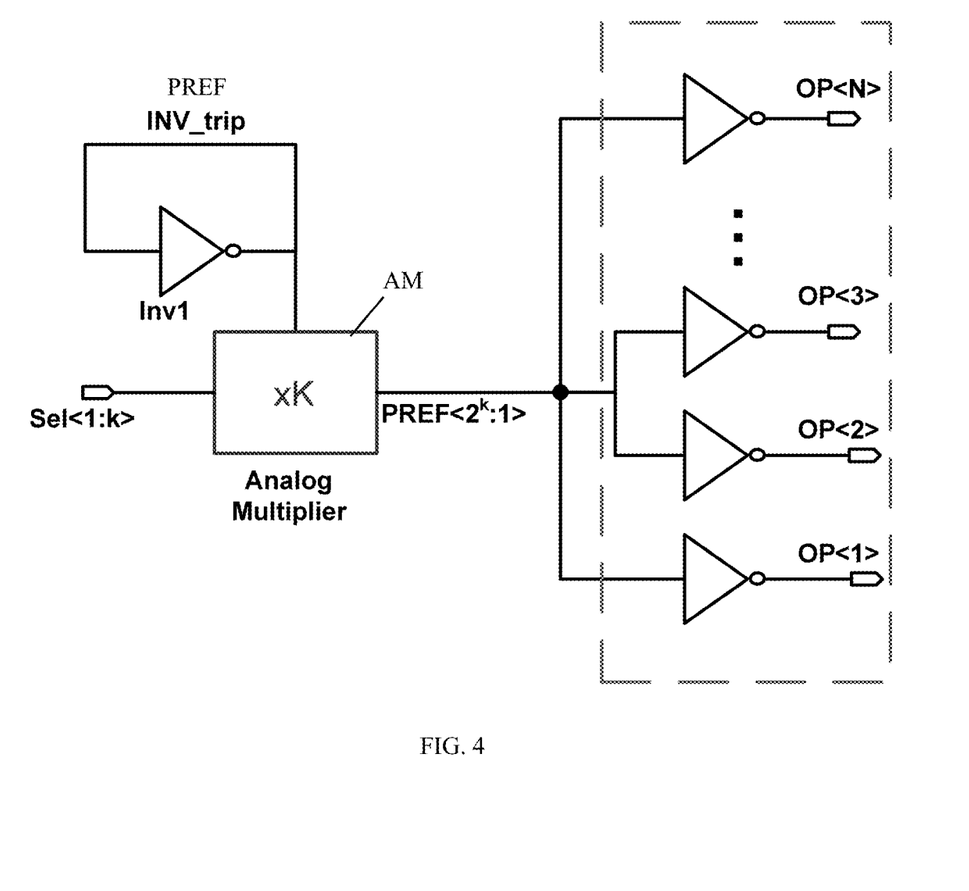
FIG. 4 is a circuit diagram of circuitry for scanning the PREF voltage of the PUF array of FIG. 3, in accordance with a non-limiting embodiment of the invention.

Reference is now made to FIG. 4, which illustrates how the PREF voltage can be scanned. The PREF voltage may be input into an analog multiplier AM (another example of adjustment circuitry), which multiplies PREF by a value K, which may be slightly below or above 1 and is programmable digitally. For example, PREF may be multiplied by ±1%. Any bits whose trip point is within 1% of the trip point of the inverter Inv1 will flip by this action and thus be exposed. In the more general sense, the PUF array is measured when the analog multiplier multiplies the array by ±K. Any bits whose values do not change, can be deemed very stable, while the bits whose values change within K of the reference inverter are unstable.

Figure 5A:
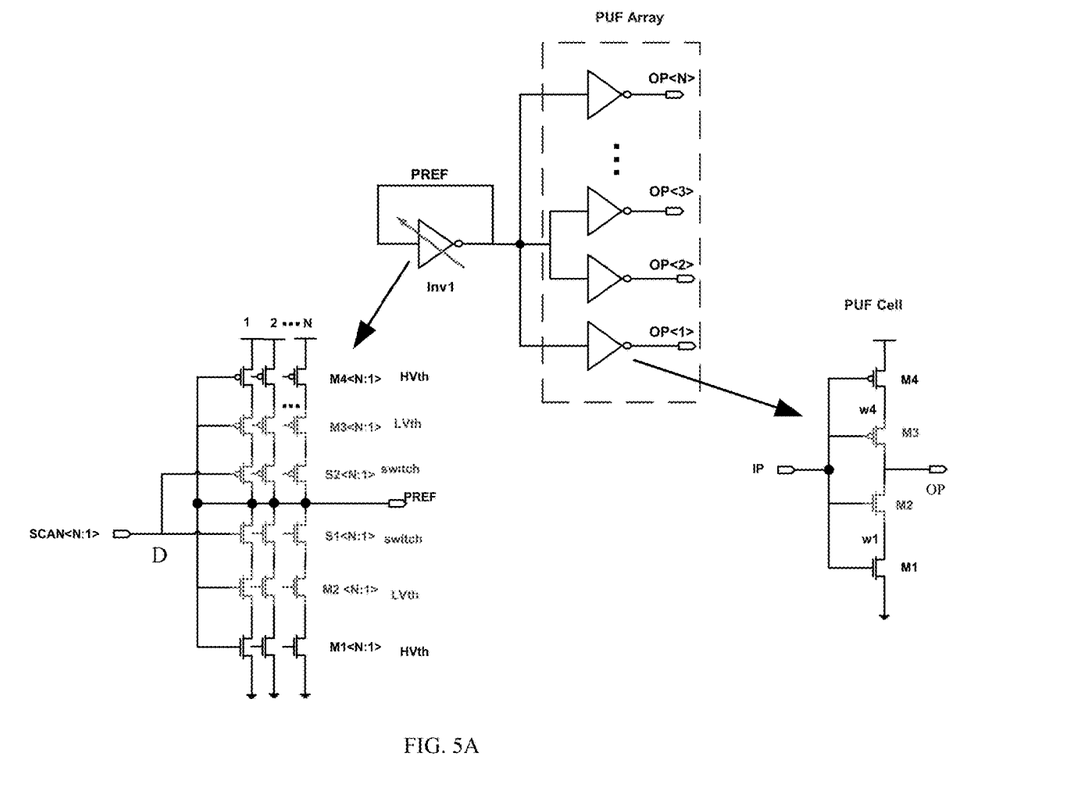
FIG. 5A is a circuit diagram of an example of a reference inverter coupled to the PUF array of FIG. 3, in accordance with a non-limiting embodiment of the invention.

One embodiment of the PUF array of FIG. 4 is shown in FIG. 5A, which shows an example of the reference inverter as well as the PUF cells. The reference inverter Inv1 includes N legs of six (or other numbers of) transistors. In each leg, M4 and M1 are HVth transistors, M2 and M3 are LVth transistors and S1 and S2 are switches. The digital bus SCAN<N:1> determine which of the legs will have the NMOS transistors enabled and which legs will have the PMOS transistors enabled. In such a way, the PMOS/NMOS ratio, and hence the trip point can be adjusted and scanned digitally. The cells in the PUF array contain the high gain inverters. It is also possible to design the reference inverter and the PUF array with standard inverters (No LVth transistors).

The circuitry of reference inverter Inv1 with its N legs of six transistors is now described.

For each leg (legs 1 to N), the input signal of the digital bus SCAN<N:1> is input, such as via a node D, to the gate of a PMOS transistor switch S2 and to the gate of an NMOS transistor switch S1. Each leg gets a single bit of the bus SCAN<N:1> coupled to the gates of S1 and S2. For example, in leg K, SCAN<K> will be coupled to the gate of S1<K> and the gate of S2<K>.

Within each leg, the source of M4 is coupled to a voltage source Vcc. The drain of M4 is coupled to the source of M3. The source of M1 is coupled to ground and the drain of M1 is coupled to the source of M2. The drain of M3 is coupled to the source of S2. The drain of M2 is coupled to the source of S1. The drains of S1 and S2 of all of the legs are coupled to each other and are coupled to the output of the reference inverter, PREF. PREF is also coupled to the gates of (M1, M2, M3 and M4) of all of the legs.

As before, the transistors M1 and M4 are high threshold voltage MOS (HVt or HVth), while M2 and M3 are low threshold voltage MOS (LVt or LVth).

Figure 5B:
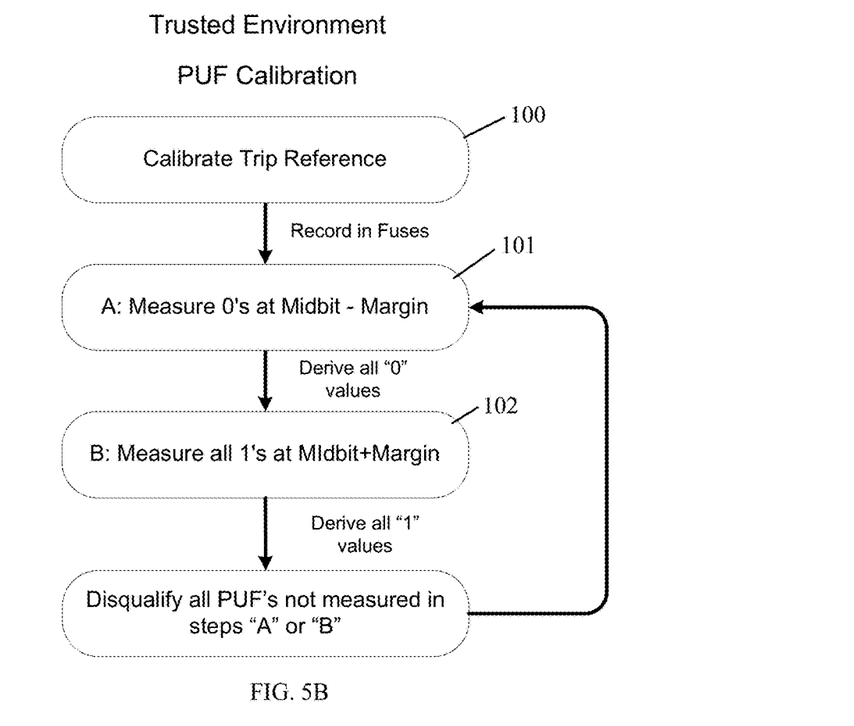
FIG. 5B is a simplified flow chart of a method of measuring the array of FIG. 5A to exclude unstable PUFs, in accordance with a non-limiting embodiment of the invention.

Reference is now made to FIG. 5B, which illustrates a method of measuring the array of FIG. 5A to exclude the unstable PUFs. First, in step 100, the trip reference of the inverter is calibrated to a level such that there is an equal amount of logical 0's and logical 1's in the array. After this point the reference inverter's trip point is digitally adjusted in step 101, such that PREF is altered from its nominal level, PREF=Midbit to a level of Midbit−Margin. Some of the PUF cells whose trip point is slightly below Midbit will change state from logic "0" to logic "1". These bits are deemed unstable, since the difference between their trip point and Midbit is less than Margin. In step 102, PREF is shifted to a value of Midbit+Margin. Any bits whose value switches from 1 to 0 are also unstable. Any bit whose value remains at 0 after step 101 and any bit whose value remains at 1 after step 102 are stable bits. In other words, bits whose state does not change after step 101 and step 102 are deemed stable. Each PUF may contain some (e.g., 2-3) cascaded inverters for amplification, as well as a latch (not shown).

Figure 6A:
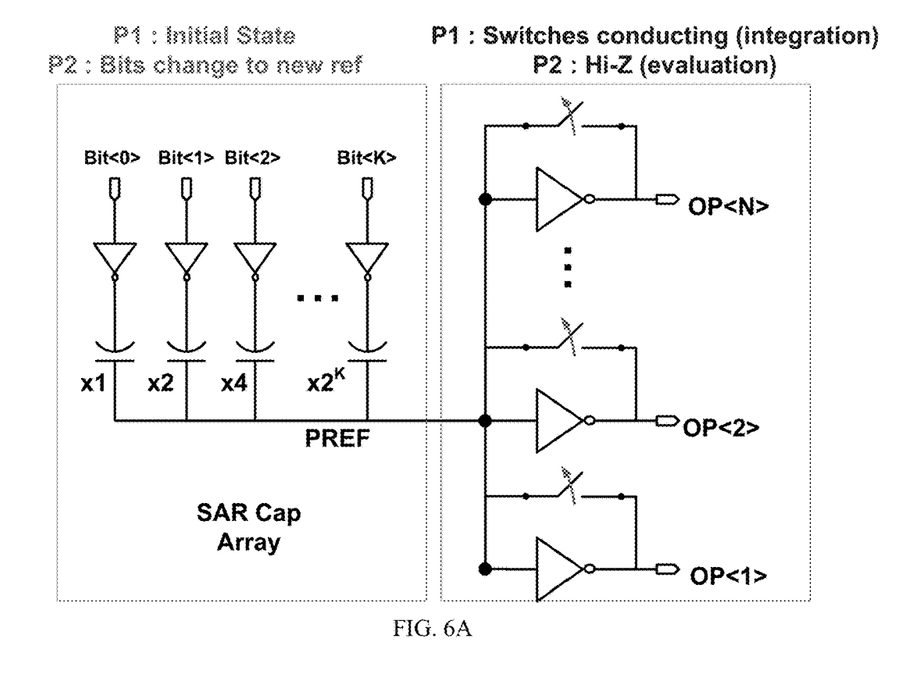
FIG. 6A is a circuit diagram of circuitry in which the PUF bits themselves are used to determine the average trip point of the array, so that the array reference PREF is self-aligned, in accordance with a non-limiting embodiment of the invention.

Another embodiment of the invention is shown in FIG. 6A. Here the PUF bits themselves are used to determine the average trip point of the array, so that the array reference PREF is self-aligned. A switch S(i) couples the input and output of each inverter I (N inverters). During clock phase 1 (P1), the integration stage, the switches are conducting so that PREF is charged to the average trip point of all of the PUFs in the array. In clock phase 2 (P2), the switches are placed in Hi-Z and PREF can be changed by charging the capacitors in the SAR (Successive Approximation Register) array (another example of adjustment circuitry). For single bit/cells, these capacitors may be very small, just enough to move PREF by several mV in either direction in order to detect the unstable bits. Each PUF may contain some (e.g., 2-3) cascaded inverters for amplification, as well as a latch (not shown).

The SAR array may have a plurality of capacitors coupled to the first reference node, and each capacitor may have its own digitally controlled bit. The digitally controlled bits may be distinct from each other.

Accordingly, there are two clock phases, phase 1 and phase 2. During phase 1, all of the switches S(i) of the entire PUF array are made conducting and the digitally controlled bit is in a first logical state of zero or one. During phase 2, all of the switches S(i) are made non-conducting and the digitally controlled bit is in a second logical state which is opposite to the first logical state of phase 1. By changing the logic state of a digitally controlled bit in phase 2, a capacitor is charged which causes a controlled adjustment in the voltage at PREF.

Figure 6B:
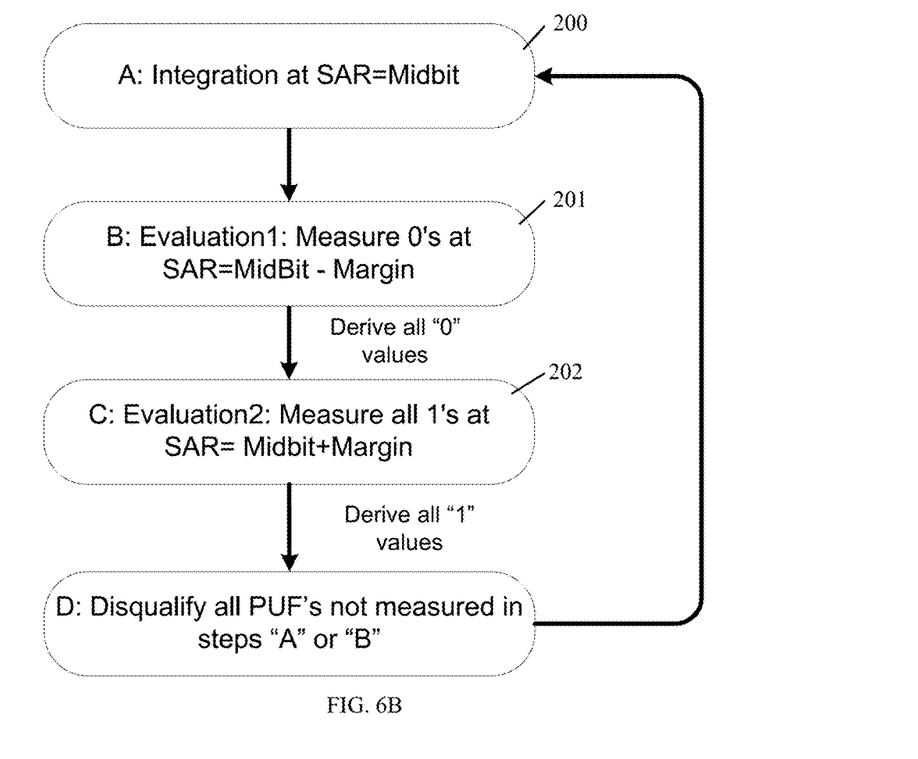
FIG. 6B is a simplified flow chart of a method of detecting and disqualifying unstable bits of the array of FIG. 6A, in accordance with a non-limiting embodiment of the invention.

Reference is now made to FIG. 6B, which illustrates a flow chart how to disqualify unstable bits for the embodiment shown in FIG. 6A. In step 200, integration takes place when the SAR array is placed right in the middle of its range, at SAR=Midbit. A SAR margin of X bits is chosen to disqualify unstable PUFs, preferably with X as small as possible. Two evaluations take place, in step 201 to measure the "0"s at SAR=Midbit−Margin and in step 202 to measure "1"s at SAR=Midbit+Margin. Any bits not found in steps B or C have their trip points very close to Midbit (within ±Margin), and are thus determined unstable and disqualified. In other words, bits which change their logic state during steps 201 or 202 have their trip point within Midbit±Margin and are deemed unstable.

Figure 7:
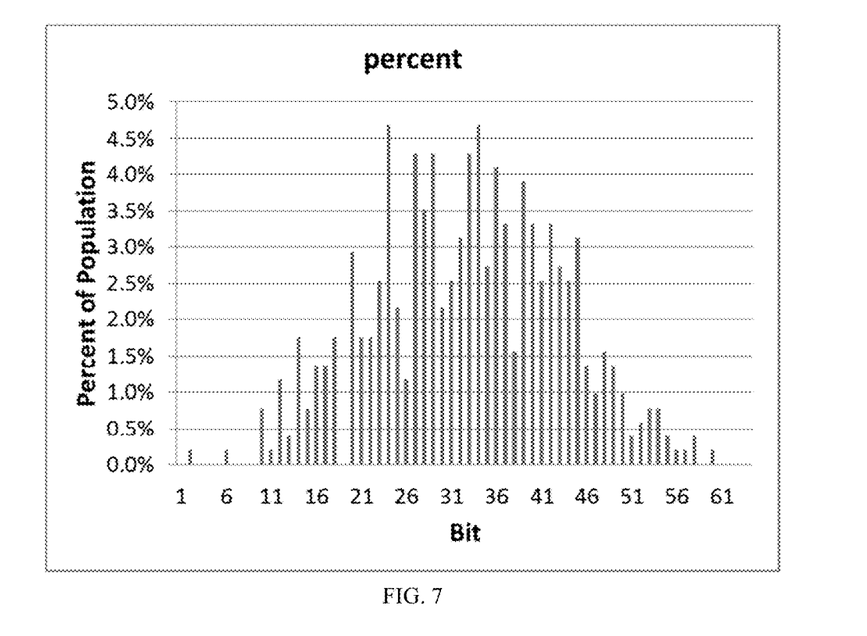
FIG. 7 is a graphical illustration of a scan histogram of a PUF array containing 512 cells for the embodiment of FIG. 6B, in accordance with a non-limiting embodiment of the present invention, wherein the mean is bit 32 and sigma=10.5 bits, and the scan is used to screen the unstable bits.

Reference is now made to FIG. 7, which illustrates a scan histogram of a PUF array containing 512 cells for the embodiment of FIG. 6B. For this array, there were 6 capacitors and 6 digitally controlled bits, meaning 64 possible level adjustments (aka scan bits) of PREF. FIG. 7 shows the percentage of cells which change state at each of the 64 scan bits. The resolution of each scan bit is roughly 1.5 mV. The cells which are closest to the middle of the range (Bit=32) are the least stable ones and should be disqualified. Any cells which are several bits away from the center have a more substantial amount of variation in them, and may be considered stable. This method can be used to screen and disqualify the unstable bits, such that the remaining bits are very stable and the ECC can be dramatically reduced or eliminated.

What is claimed is:

1. A physical unclonable function (PUF) array comprising:
    a plurality of PUF transistor cells each of which comprises at least one inverter, wherein an input of said at least one inverter is shorted to a first reference node;
    adjustment circuitry for adjusting a reference voltage of said first reference node; and
    measurement, circuitry for measuring a trip point of said at least one inverter, wherein if said trip point is approximate to said reference voltage then bits of said at least one inverter are defined as unstable, wherein said at least one inverter is a high gain inverter comprising a first set of a PMOS device and an NMOS device and a second set of a PMOS device and an NMOS device, wherein threshold voltages of the PMOS and NMOS devices of the first set are higher than the threshold voltages of the PMOS and NMOS devices of the second set, and wherein the PMOS device of the second set is coupled to a drain of the PMOS device of the first set and to an output of the PUF array, and the NMOS device of the second set is coupled to a drain of the NMOS device of the first set and to the output of the PUF array.

2. A physical unclonable function (PUF) array comprising:
    a plurality of PUF transistor cells each of which comprise at least one inverter, wherein an input of said at least one inverter is shorted to a first reference node;
    adjustment circuitry for adjusting a reference voltage of said first reference node; and
    measurement circuitry for measuring a trip point of said at least one inverter, wherein if said trip point is approximate to said reference voltage then bits of said at least one inverter are defined as unstable, further containing a reference inverter whose input and output are shorted to said first reference node and wherein a ratio of PMOS to NMOS of said reference inverter is adjustable.

3. The PUF array according to claim 2, wherein said reference inverter comprises a plurality of parallel legs, each of said legs comprising an at least one PMOS active device and an at least one NMOS active device, wherein gates of the at least one PMOS and at least one NMOS active devices are coupled to said first reference node, and wherein a first switch is coupled between a drain of the PMOS active device and said first reference node and a second switch is coupled between a drain of the NMOS active device and said first reference node, and wherein each of said switches of each of said legs can be turned on or off by a digital signal.

4. The PUF array according to claim 1, further comprising a switch connecting the input and output of said at least one inverter.

5. The PUF array according to claim 4, further comprising at least one capacitor coupled between said first reference node and a digitally controlled bit.

6. The PUF array according to claim 5, wherein there are two clock phases, phase 1 and phase 2, wherein during phase 1, said switch is made conducting and said digitally controlled bit is in a first logical state of zero or one, and during phase 2, said switch is made non-conducting and said digitally controlled bit is in a second logical state which is opposite to the first logical state of phase 1.

7. The PUF array according to claim 6, wherein said at least one capacitor comprises a plurality of capacitors coupled to said first reference node, and wherein each of said capacitors has its own digitally controlled bit, and the digitally controlled bits are distinct from each other.

8. The PUF array according to claim 2, wherein for said at least one inverter an input signal IP is input to a gate of a PMOS transistor M4, to a gate of a PMOS transistor M3, to a gate of an NMOS transistor M2, and to a gate of an NMOS transistor M1, wherein threshold voltages of M1 and M4 are higher than threshold voltages of M2 and M3, and wherein a source of M4 is coupled to a voltage source Vcc, a drain of M4 is coupled to a source of M3, a source of M1 is coupled to ground and a drain of M1 is coupled to a source of M2, and drains of M2 and M3 are coupled to each other and to an output signal OP of said at least one inverter;

and wherein said reference inverter comprises N legs of transistors, and within each leg, a source of a second PMOS transistor M4 is coupled to a voltage source Vcc, a drain of the second transistor M4 is coupled to a source of a second PMOS transistor M3, a source of a second NMOS transistor M1 is coupled to ground and a drain of the second transistor M1 is coupled to a source of a second NMOS transistor M2, a drain of the second transistor M3 is coupled to a source of a PMOS transistor switch S2, a drain of the second transistor M2 is coupled to a source of an NMOS transistor switch S1, and for each of the legs, an input signal of a digital bus SCAN<N:1> is input to the gate of the PMOS transistor switch S2 and to the gate of the NMOS transistor switch S1, and wherein the drains of switches S1 and S2 of all of the legs are coupled to each other and are coupled to an output PREF of the reference inverter, and PREF is also coupled to the gates of the second transistors M1, M2, M3 and M4 of all of the legs, and wherein threshold voltages of the second transistors M1 and M4 are higher than threshold voltages of the second transistors M2 and M3 and PREF is coupled to IP.

9. The PUF array according to claim 2, wherein said adjustment circuitry has an operating mode wherein:
a trip reference of said reference inverter is calibrated to a level such that there is an equal amount of logical 0's and logical 1's in said PUF array;
the trip point of the reference inverter is adjusted such that said first reference voltage is altered from its nominal level to a level higher than the nominal level and to a level lower than the nominal level, and if a cell of said PUF array changes its logical state at levels higher or lower than the nominal level, it is defined as an unstable bit.

10. The PUF array according to claim 7, wherein changing the digitally controlled bit changes the voltage of the reference node by a measured amount, MARGIN, in either an up or down direction and any PUF bit in the array which does not change its state when changed up and down by MARGIN is deemed stable.

11. The PUF array according to claim 2, further comprising a switch connecting the input and output of said at least one inverter.

* * * * *